United States Patent
Perissakis et al.

(10) Patent No.: US 10,759,384 B2
(45) Date of Patent: Sep. 1, 2020

(54) PATTERN DETECTION FOR AUTOMOTIVE ACCESS

(71) Applicant: NXP B.V., Eindhoven (NL)

(72) Inventors: Stylianos Perissakis, Graz (AT); Martin Posch, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/101,930

(22) Filed: Aug. 13, 2018

(65) Prior Publication Data
US 2019/0143938 A1    May 16, 2019

(30) Foreign Application Priority Data
Nov. 10, 2017 (EP) .................... 17201003

(51) Int. Cl.
*B60R 25/20* (2013.01)
*B60R 25/24* (2013.01)
(Continued)

(52) U.S. Cl.
CPC .......... *B60R 25/24* (2013.01); *G07C 9/00309* (2013.01); *H04B 1/709* (2013.01);
(Continued)

(58) Field of Classification Search
CPC ......... B60R 25/24; B60R 25/00; B60R 25/04; B60R 25/2036; G07C 2009/0038; G07C 2009/00793; G07C 9/00309; G07C 2009/00325; G07C 9/0069; G06F 3/017; G06F 3/038; H04B 10/114; H04B 10/40; H04B 1/709; H04L 12/413; H04L 27/02; H04L 27/10; H04L 27/14; H04L 27/142; H04L 27/16; H04L 27/2601; H04L 27/2602; H04L 27/2613; H04L 27/2647; H04L 49/90; H04L 5/0007; H04L 5/0048; H04L 7/0334; H04L 7/042; H04L 7/10; E05B 81/78; E05Y 2900/531; H04M 3/42; H04W 28/065; H04W 52/0229; H04W 74/0833; H04W 84/12; H04W 88/06

See application file for complete search history.

(56) References Cited

U.S. PATENT DOCUMENTS 5,122,984 A * 6/1992 Strehler ............ G06F 16/90339
                                                        365/49.1
9,786,109 B2    10/2017 Posch
(Continued)

FOREIGN PATENT DOCUMENTS

| EP | 2119855 A1 | 11/2009 |
| EP | 3185220 A1 | 6/2017 |
| JP | H05-19025 | 8/1994 |

*Primary Examiner* — Dionne Pendleton

(57) ABSTRACT

The disclosure relates to pattern detection unit and associated method. The unit comprises a shift register configured to over-sample a multi-bit input signal such that each bit of the input signal is represented by a plurality of samples in the shift register; and a correlator configured to compare a target pattern with two or more sample-sets, each sample-set comprising a corresponding sample from each of the plurality of samples of each bit, and classify each compared sample-set as one of: an exact match; an inexact match; or a non-match to the target pattern in order to determine whether or not the input signal matches the target pattern.

14 Claims, 8 Drawing Sheets

(51) Int. Cl.
  *B60R 25/04* (2013.01)
  *E05B 81/78* (2014.01)
  *G07C 9/00* (2020.01)
  *H04B 1/709* (2011.01)
  *H04W 88/06* (2009.01)

(52) U.S. Cl.
  CPC .... *H04W 88/06* (2013.01); *G07C 2009/0038* (2013.01); *G07C 2009/00325* (2013.01); *G07C 2009/00555* (2013.01); *G07C 2009/00793* (2013.01)

(56) References Cited

U.S. PATENT DOCUMENTS

| | | | | |
|---|---|---|---|---|
| 2009/0279886 | A1* | 11/2009 | Suvakovic | H04L 7/042 398/26 |
| 2011/0019788 | A1* | 1/2011 | Shibata | H04L 7/0334 375/371 |
| 2013/0022154 | A1* | 1/2013 | Hambeck | H04B 1/709 375/316 |
| 2018/0029561 | A1* | 2/2018 | Posch | B60R 25/2036 |
| 2018/0376370 | A1* | 12/2018 | Shellhammer | H04W 28/065 |

* cited by examiner

PATTERN DETECTION FOR AUTOMOTIVE ACCESS

The present disclosure relates to the field of pattern detection, and in particular, although not exclusively, to a pattern detection unit for a transceiver in an automotive access system.

Passive keyless entry (PKE) and passive keyless go (PKG) systems have gained popularity in recent years. In operation, when a car user has a key apparatus that is equipped with a PKE chip and the user approaches a car and attempts to opens the door, a low frequency (LF) communication sequence is sent from the car to the key, and an ultra-high frequency (UHF) communication is sent from the key to the car via a different physical link, and the door is unlocked. Cryptology is involved in both communications to make sure the correct key and car are identified. The same interaction can work with a start button for a vehicle using PKG. When the user presses the start button, an LF communication is sent to the key, which returns a UHF signal to the vehicle to enable the user to start the car.

According to a first aspect of the present disclosure there is provided a pattern detection unit comprising:
 a shift register configured to over-sample a multi-bit input signal such that each bit of the input signal is represented by a plurality of samples in the shift register; and
 a correlator configured to compare a target pattern with two or more sample-sets, each sample-set comprising a corresponding sample from each of the plurality of samples of each bit, and classify each compared sample-set as one of:
 an exact match;
 an inexact match; or
 a non-match
to the target pattern in order to determine whether or not the input signal matches the target pattern.

In one or more embodiments the input signal is determined to match the target pattern if one of the following conditions are satisfied within a predetermined number of sample-sets:
 two or more of the sample-sets are an exact match to the target pattern; or
 one sample-set is an exact match to the target pattern and one or more sample-sets are an inexact match to the target pattern. The predetermined number of sample-sets may be equal to, or less than, the number of the plurality of samples representing each bit.

In one or more embodiments, the correlator is configured to compare the target pattern with one of the sample-sets. The correlator may be configured to compare subsequently the target pattern to another of the sample-sets in order to compare the target pattern to the two or more sample-sets.

In one or more embodiments, the correlator is configured to compare the target pattern to consecutive sample-sets from the shift register.

In one or more embodiments, the correlator comprises a plurality of bit-comparison-units. Each bit-comparison-unit may be configured to compare one sample of a particular bit from the shift register with a corresponding bit-value of the target pattern. Each bit-comparison-unit may be configured to determine a bit-comparison-value based on the comparison. The correlator may comprise a code-comparison-unit. The code-comparison-unit may be configured to sum the bit-comparison-values for one sample-set in order to determine a match-indication-signal that is representative of the number of samples in the sample-set that match their corresponding bit-value of the target pattern. An addition may be equivalent to a summation.

In one or more embodiments, the correlator comprises a sequence detector configured to determine whether the input signal matches the target pattern based on two or more match-indication-signals provided by the code-comparison-unit for different sample-sets.

In one or more embodiments, the code-comparison-unit is configured to generate a match-status by comparing the match indication signal with: at least one inexact match-threshold; and an exact match-threshold.

In one or more embodiments, the correlator comprises a sequence detector configured to determine whether the input signal matches the target pattern based on two or more match-statuses provided by the code-comparison-unit for different sample-sets.

In one or more embodiments, the correlator is configured to compare the target pattern with one of the sample-sets and, in parallel, to compare the target pattern with another of the sample-sets in order to compare the target pattern to the two or more sample-sets.

In one or more embodiments, the correlator comprises a first plurality of bit-comparison-units. Each bit-comparison-unit may be configured to compare a first sample of a particular bit from the shift register with a corresponding bit-value of the target pattern. Each bit-comparison-unit may be configured to determine a first bit-comparison-value based on the comparison. The correlator may comprise a second plurality of bit-comparison-units. Each bit-comparison-unit may be configured to compare a second sample of the particular bit from the shift register with a corresponding bit-value of the target pattern. Each bit-comparison-unit may be configured to determine a second bit-comparison-value based on the comparison. The correlator may comprise a code-comparison-unit. The code-comparison-unit may be configured to sum the first bit-comparison-value in order to determine a first-match-indication-signal that is representative of the number of samples in a first sample-set that match the corresponding bit-value of the target pattern. The code-comparison-unit may be configured to sum the second bit-comparison-value in order to determine a second-match indication-signal that is representative of the number of samples in a second sample-set that match the corresponding bit-value of the target pattern.

In one or more embodiments, the code-comparison-unit is configured to generate a first-match-status for the first sample and a second-match-status for the second sample by comparing the respective first and second match indication signals with: an inexact match-threshold; and an exact match-threshold.

The exact match-threshold may correspond to all of the samples in a sample-set matching their corresponding bit-value of the target pattern. The inexact match-threshold may correspond to some but not all of the samples in a sample-set matching their corresponding bit-value of the target pattern. The match-indication-signal may be the number of samples in the sample-set that match their corresponding bit-value of the target pattern. The match-indication-signal may be the number of samples in the sample-set that do not match their corresponding bit-value of the target pattern.

In one or more embodiments, the pattern detection unit may be configured to be operable in a first-mode-of-operation and a second-mode-of-operation. In the first-mode-of-operation, the correlator may be configured to compare the target pattern with two or more of the plurality of samples of each bit from the shift register in order to determine whether or not the input signal matches the target pattern. In the second-mode-of-operation, the correlator may be configured to compare the target pattern with only one of the plurality of samples of each bit from the shift register in order to determine whether or not the input signal matches the target pattern. The pattern detection unit may further comprise a controller configured to set the mode of operation of the pattern detection unit based on user input or automatically.

According to a further aspect of the invention there is provided an automotive access system transceiver, the transceiver comprising:
- a receiver for receiving a multi-bit input signal;
- a data-receiving circuit comprising a pattern detection unit;
- a transmitter; and
- a control circuit to control the transmitter and receiver for communicating signals with a vehicle base station,
- wherein the target pattern is associated with the vehicle base station, and
- wherein the controller is configured, in response to finding a match between the input signal and the target pattern, to operate the transmitter of the remote transceiver circuit to send an authorisation signal to the vehicle base station.

An access system transceiver is also disclosed, the transceiver comprising:
- a receiver for receiving a multi-bit input signal;
- a data-receiving circuit comprising a pattern detection unit;
- a transmitter; and
- a control circuit to control the transmitter and receiver for communicating signals with a base station,
- wherein the target pattern is associated with the base station, and
- wherein the controller is configured, in response to finding a match between the input signal and the target pattern, to operate the transmitter of the remote transceiver circuit to send an authorisation signal to the base station.

According to a further aspect there is provided a method of detecting a pattern in an input signal, comprising:
- receiving a multi-bit input signal at a shift register;
- over-sampling the multi-bit input signal using the shift register such that each bit of the input signal is represented by a plurality of samples from the shift register;
- comparing a target pattern with two or more sample-sets, each sample-set comprising a corresponding sample from each of the plurality of samples of each bit; and
- classifying each compared sample-set as one of:
  - an exact match;
  - an inexact match; or
  - a non-match to the target pattern in order to determine whether or not the input signal matches the target pattern.

A pattern detection unit is also disclosed that comprises:
- a shift register configured to over-sample a multi-bit input signal such that each bit of the input signal is represented by a plurality of samples in the shift register; and
- a correlator configured to compare a target pattern with two or more sample-sets, each sample-set comprising a corresponding sample from each of the plurality of samples of each bit, and classify each compared sample-set as: an exact match, an inexact match; or a non-match, to the target pattern in order to determine whether or not the input signal matches the target pattern.

While the disclosure is amenable to various modifications and alternative forms, specifics thereof have been shown by way of example in the drawings and will be described in detail.

It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which:

FIG. 4b illustrates an example implementation of a sequence detector for use in the pattern detection unit of FIG. 4a;

FIG. 5 illustrates bit-mismatch-values for an example input signal generated by one configuration of the pattern detection unit of FIGS. 3 and 4a;

FIG. 6 illustrates bit-match-values for an example input signal generated by another configuration of the pattern detection unit of FIGS. 3 and 4a;

FIG. 7a illustrates false alarm rate dependence on the number of bits in a target pattern for various configurations of the pattern detection unit of FIGS. 3 and 4a;

FIG. 7b illustrates the missed alarm rate dependence on the signal-to-noise ratio for various configurations of the pattern detection unit of FIGS. 3 and 4a;

Figure 3:
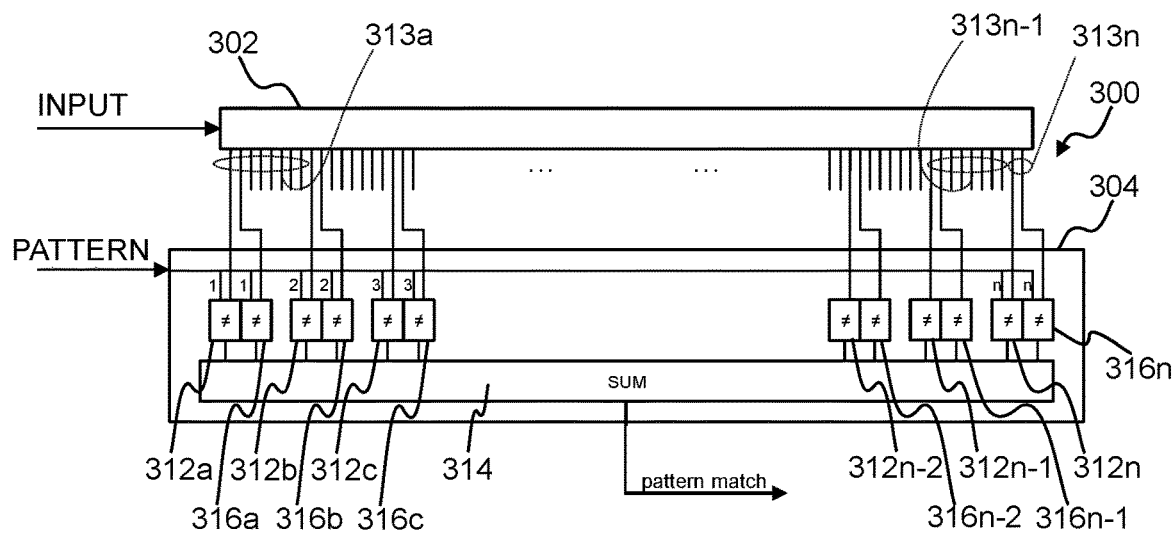
FIG. 3 illustrates an improved pattern detection unit.
Figure 4A:
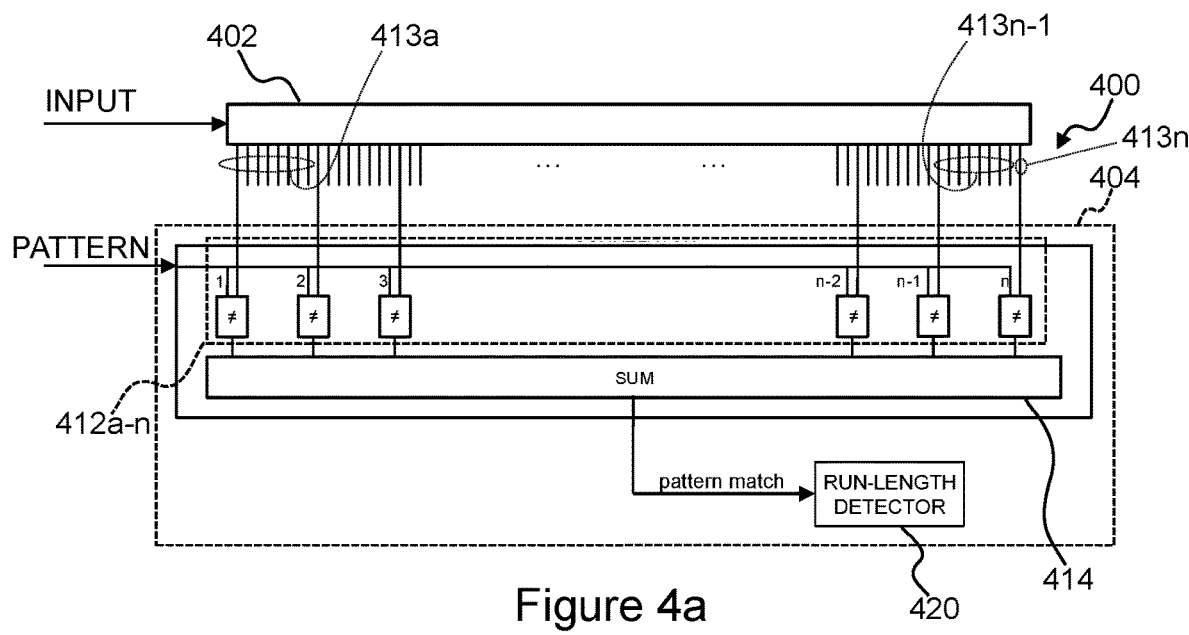
FIG. 4a illustrates another improved pattern detection unit.
Figure 8:
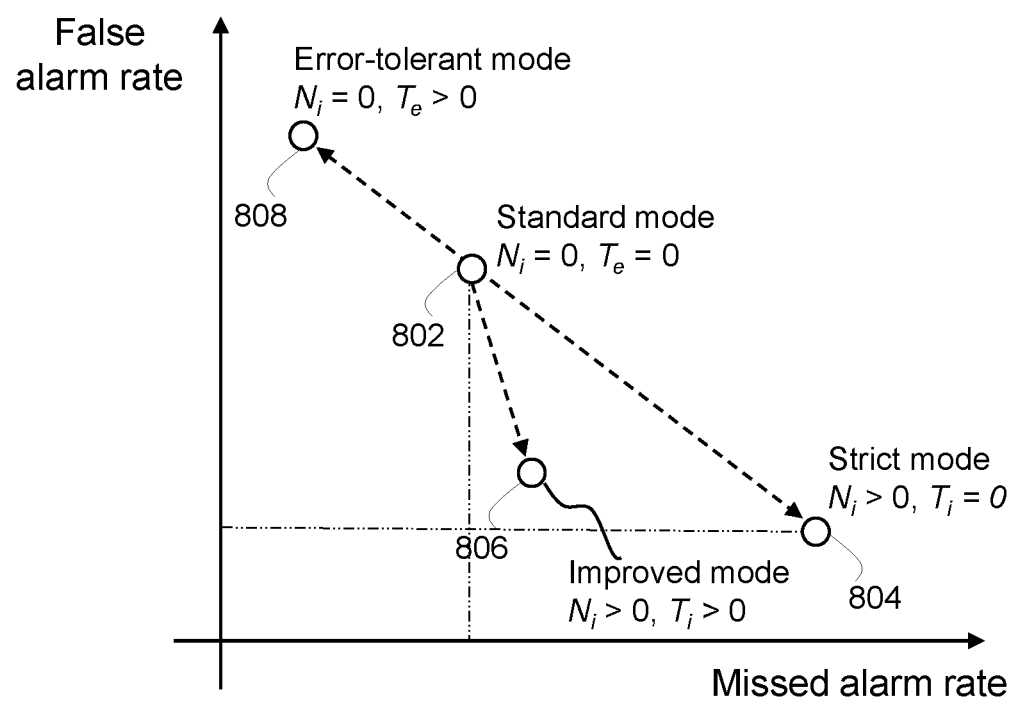
Figure 9:
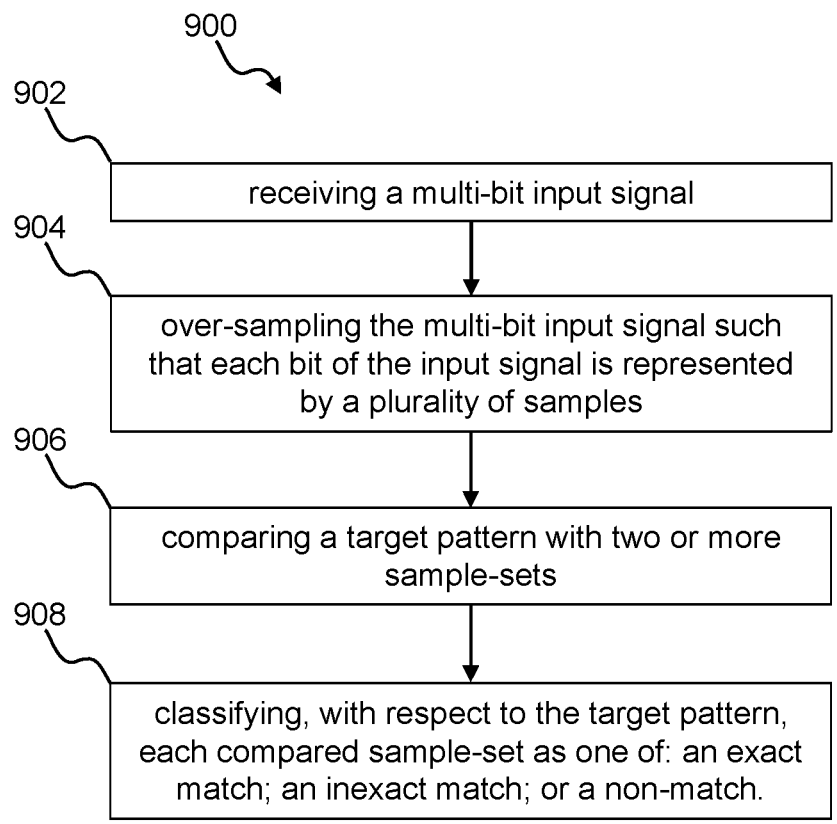

FIG. 8 conceptually illustrates the control of false alarm rate and missed alarm rate arising from the pattern detection units of FIGS. 3 and 4a; and FIG. 9 illustrates a pattern detection method.

The system described herein is related but not limited to the wireless communication link between a vehicle and a key for the vehicle. By way of example, the system described herein is related to a wireless communication link between a car and the car key thereof. A car (base station) transmits protocol frames in the low frequency (LF) band and a receiver in the car key receives and decodes the frames. The LF transmission is unidirectional from the car to the keys and it may be complemented with an ultra-high frequency (UHF) transmission from the keys to the car. The LF band (at 125 kHz, for example) can be useful in a metal environment (as with automobiles) and is relatively insensitive to body de-tuning (e.g., by touching). The LF receiver in the car key may stay active all of the time, or in a polling mode. Thus current consumption is a concern.

Since steady-state current consumption of the key limits the battery lifetime, in most such products the majority of the integrated circuitry is powered down or otherwise inactive, and only the LF receiver stays active all of the time. Only when the car-side IC transmits a predetermined binary pattern, which is detected by the LF receiver, does the rest of the key IC "wake up"—therefore the term "wakeup receiver" is often used to describe such a system.

Figure 1:
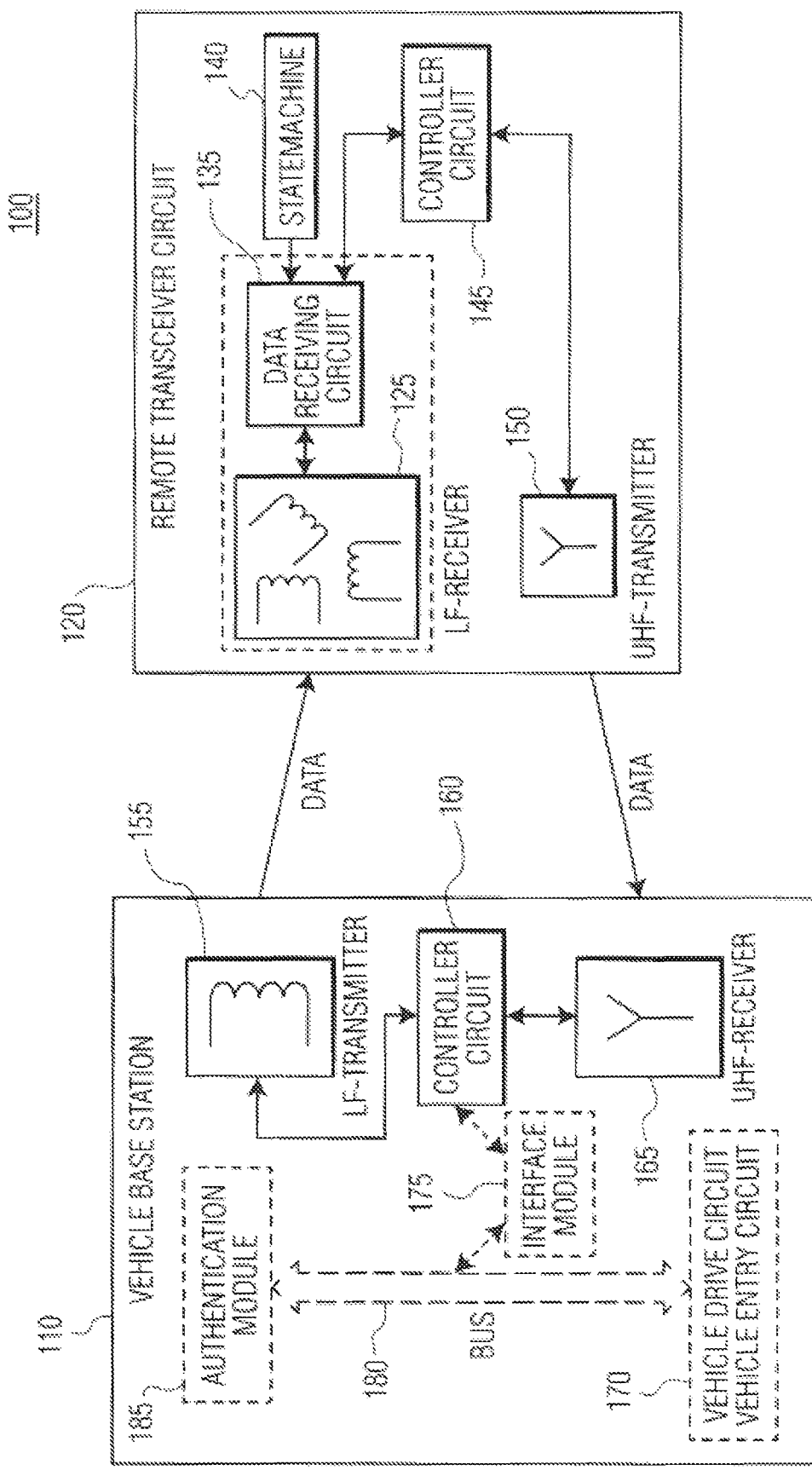
FIG. 1 shows an apparatus for communicating with a remote transceiver.

FIG. 1 illustrates apparatuses and a system 100 to communicate with a remote transceiver circuit 120. The system 100 may include a vehicle base station 110 and a remote transceiver circuit 120. Each of the base station 110, and remote transceiver circuit 120 can be implemented separately. The system 100 can be implemented with the base station 110 and the remote transceiver circuit 120 while the base station 110 is also interacting with another remote transceiver circuit. In these contexts, the remote transceiver circuit 120 may be a PKE and/or PKG type of hand-held device that can be carried by an operator (e.g., in a pocket or handbag).

The vehicle base station 110 includes a transmitter 155, receiver 165 and a controller circuit 160. The transmitter 155 of the vehicle base station 110 may be a low-frequency transmitter, and the receiver 165 of the vehicle base station 110 may be an ultra-high-frequency receiver.

The vehicle base station 110 may utilize a controller circuit 160 to control the transmitter 155 and receiver 165 to communicate signals with remote transceiver circuit 120. Accordingly, the controller circuit 160 may be implemented to facilitate data transmission via the transmitter 155 to communicate with the remote transceiver circuit 120.

The controller circuit 160 of the vehicle base station 110 may delegate authentication of the remote transceiver circuit 120 to an authentication module 185. Accordingly, the controller circuit 160 may generate an output to the interface module 175 containing the response data of the remote transceiver circuit 120 as received by the receiver 165 of the vehicle base station 110. The interface module 175 then communicates the response data to an authentication module 185 via a bus 180. The authentication module 185 processes the response data received from the remote transceiver circuit 120 with stored authentication data. If the remote transceiver circuit 120 is authenticated, the authentication module 185 communicates activation data over the vehicle bus 180, and the activation data allows for the operation of a vehicle drive circuit 170 that facilitates operation of a vehicle drive system in the vehicle.

The remote transceiver circuit 120 may include a receiver 125, a transmitter 150, a controller circuit 145 and a data-receiving circuit 135. The remote transceiver circuit 120 may further include a state machine 140. The receiver 125 of the remote transceiver circuit 120 may be a low-frequency receiver that corresponds to the transmitter 155 of the vehicle base station 110. The transmitter 150 of the remote transceiver circuit 120 may be an ultra-high-frequency transmitter that corresponds to the receiver 165 of the vehicle base station 110.

The remote transceiver circuit 120 utilizes the controller circuit 145 to control the transmitter 150 and receiver 125 for communicating signals with vehicle base station 110. In use, the controller circuit 160 and transmitter 155 of the vehicle base station 110 poll for the presence of the remote transceiver circuit 120 by periodically transmitting a LF signal. The receiver 125 of the remote transceiver circuit 120 monitors for the presence of the LF signal comprising a particular data pattern. The data-receiving circuit 135 of the remote transceiver circuit 120 comprises a pattern detection unit (not shown). The pattern detection unit is configured to compare a signal from the data-receiving circuit 135 with a target pattern, or a number of target patterns. Each vehicle base station 110 is associated with one or more target patterns that are individual to that vehicle base station 110. When the remote transceiver circuit 120 is within range of the vehicle base station 110, the receiver 125 and data-receiving circuit 135 of the remote transceiver circuit 120 provide the LF signal to the controller circuit 145, which determines whether or not the data pattern in the LF signal matches the target pattern. In response to finding a match, the controller circuit 145 operates the transmitter 150 of the remote transceiver circuit 120 to send an authorisation signal back to the vehicle base station 110.

The state machine 140 of the remote transceiver circuit 120 facilitates on and off modes of the data-receiving circuit 135.

The embodiment shown in FIG. 1 may be implemented to conserve power using one or more approaches as described herein. In addition, one or more embodiments may be implemented with transceiver circuits used in vehicle applications, such as PKE applications, such as with single chip keyless entry transceivers employing a RISC controller. The RISC controller may be powered with an ISO 14443 type A interface. In other embodiments, the remote transceiver circuit may implement a controller with a built-in UHF transmitter or a transmitter with a separate controller.

A passive keyless entry (PKE)/passive keyless go (PKG) receiver described herein may make use of several integrated circuit devices that include a fully integrated single-chip solution combining remote keyless entry (RKE), PKE and immobilizer (IMMO) functionality designed for use in automotive environments.

Figure 2:
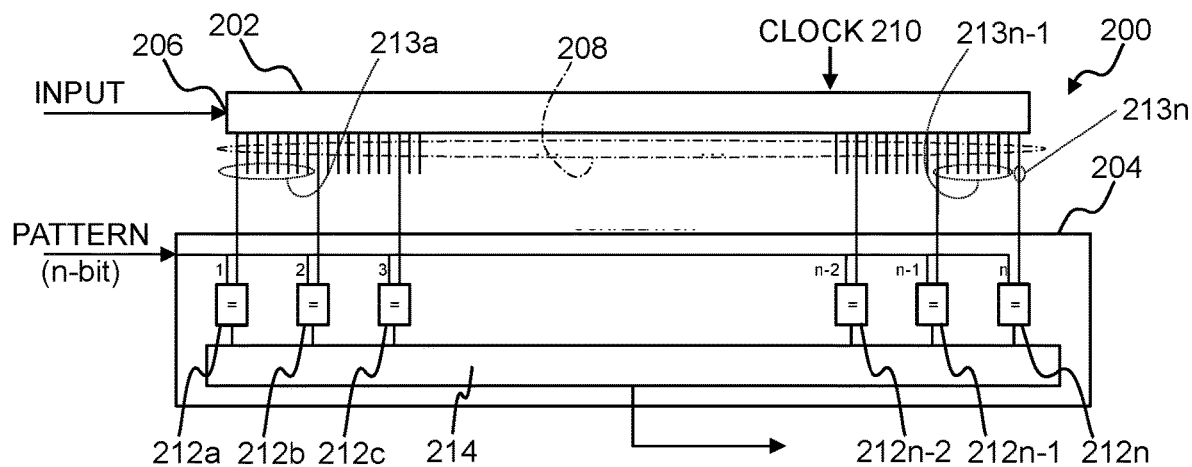
FIG. 2 illustrates a pattern detection unit for the remote transceiver circuit of FIG. 1.

FIG. 2 illustrates a pattern detection unit 200 for the data-receiving circuit of the remote transceiver circuit described above with reference to FIG. 1. The pattern detection unit 200 comprises a shift register 202 and a correlator 204.

The shift register 202 has a data input terminal 206 and a plurality of sample registers (not shown). The shift register 202 is configured to over-sample an n-bit input signal such that a plurality of (m) binary samples of the input signal are taken over the duration of a bit period. In this way, each bit can be represented by a plurality of m-samples as it passes through the shift register. Ideally, the set of m samples corresponding to the same bit would be identical, but due to noise and other effects some of the m samples will be incorrect. Each bit may be considered to provide a separate symbol.

The sample registers operate in a conventional manner such that the n-bit input signal is received as a serial communication at the data input terminal 206. During operation, the input signal received at the data input terminal 206 is sequentially shifted through the sample registers in the shift register 202 in response to each pulse in a clock cycle. The shift register 202 has a clock frequency 210 that is m times the bit rate of the input signal at the data input terminal 206 in order to oversample the input signal. An analogue input signal may be digitized into single-bit (binary) samples at an oversampling rate of m samples per bit. A train of m-samples is therefore generated for each bit of the input signal as it enters the shift register. The train of m-samples therefore progresses sequentially through the sample registers in the shift register.

The samples within the shift register 202 may be considered as being grouped into sample-sets. A sample-set comprises one corresponding sample from each of the plurality of m-samples of each bit. For example, a first sample-set comprises the first sample from each of the plurality of m-samples of each bit. Similarly, the $m^{th}$ sample-set comprises the $m^{th}$ sample from each of the plurality of each sample-bit. In other words, samples within a given sample-set comprise every $m^{th}$ sample in the shift register.

The sample registers can be considered to be grouped together in sample-register-groups, with each sample-register-group comprising one or more sample registers. The first sample-register-group 213a to the n–1$^{th}$ sample-register-group 213n–1 contain m sample registers such that the full batch of m samples can be passed on to the next sample-register-group in the shift register 202. The n$^{th}$ (last) sample-register-group 213n includes at least one sample register. In this example, the n$^{th}$ (last) sample-register-group 213n includes a single sample register because only one signal from the n$^{th}$ sample-register-group 213n needs to be processed by the correlator 204, and because there are no subsequent sample-register-groups for the samples to be passed on to. The shift register 202 therefore comprises (n–1)*m+1 sample registers to hold the last (n–1)*m+1 signal samples. The sample registers in each sample-register-group are contiguous with the sample registers in neighbouring sample-register-groups. Each sample register has a separate output terminal 208 in this example.

The correlator 204 comprises a plurality of bit-comparison-units 212a-n and a code-comparison-unit 214. An output terminal from one sample register in each sample-register-group is connected to a first input terminal of an associated bit-comparison-unit 212a-n. The selected sample registers are spaced apart by m-samples, in this example. For instance, the output terminal of the first sample register of each sample-register-group is connected to the first input terminal of a respective bit-comparison-unit 212a-n. In this way, the bit-comparison-units 212a-n are connected to a single sample-set. A second input terminal of each bit-comparison-unit 212a-n is configured to receive a bit-value of an n-bit target pattern corresponding to the respective sample-register-group associated with the bit-comparison-unit 212a-n. For example, the first bit of the target pattern is compared with a sample from the first sample-register-group, and the n$^{th}$ bit of the target pattern is compared with a sample from the n$^{th}$ sample-register-group. In this way, each bit-comparison-unit 212a-n is able to compare one sample of a particular bit-value in the shift register with a corresponding bit-value of the target pattern and provide a bit-comparison value at an output terminal of the bit-comparison-unit 212a-n. The bit-comparison-value indicates whether or not a particular sample matches a corresponding bit-value of the target pattern.

The code-comparison-unit 214 has an output terminal and a plurality of input terminals connected to respective output terminals of the plurality of bit-comparison-units 212a-n. The code-comparison-unit 214 is configured to receive the bit-comparison-values from each of the bit-comparison-units 212a-n and determine whether, overall, the sample-set matches the target pattern. The code-comparison-unit 214 may be implemented by a multi-input AND gate and each bit-comparison-unit 212a-n may be implemented by an XNOR gate. Alternatively, the code-comparison-unit 214 may be implemented by a multi-input NOR gate and each bit-comparison-unit 212a-n may be implemented by an XOR gate.

The effect of over-sampling the data is that the correlator has m attempts to determine a match for each bit. That is, there are m sample-sets to compare with the target pattern. In this way, the failure to identify a match due to corruption of a sample can be avoided or reduced and so the sensitivity of the system is improved.

In this way, the correlator 204 is configured, using the bit-comparison-units 212a-n, to compare a target pattern to a sample of each bit of the input signal in the shift register 202, and, using the code-comparison-unit 214, to determine whether the input signal matches the target pattern based on the comparison.

If a data stream is presented at the data input terminal 206 by a data receiving circuit, the correlator 204 indicates a match only if the incoming data stream is equal to the target pattern (a target pattern or wake-up pattern). That is, if each sample of the sample-set matches a corresponding bit of the target-pattern. In all other cases it does not signal a match.

It is expected that when the signal-to-noise ratio of the incoming signal is high enough, a match will be detected more than once per bit of the input signal. Up to m match attempts may be successful, as the samples are shifted through the shift register, since ideally in every bit all m samples should be identical. The noise present in the input waveform causes some samples to be incorrect, with the ones closer to the bit boundaries more likely to be affected. Therefore, increasing level of noise causes the match to be detected for fewer sample periods, as more samples are corrupted.

If no input signal is present, the correlator 204 is fed with noise samples from the receiver front-end. These noise samples are uncorrelated. Due to counting statistics, it is possible that the noise from the receiver front end exactly matches the wanted bit pattern, which results in the correlator 204 signalling a match. Such an event is called a false alarm, as the correlator 204 signals a match even though there was no wanted input signal.

Returning to FIG. 1, when a target pattern is identified in the received input signal, the data receiving circuit 135 of the remote transceiver circuit 120 may start the controller circuit 145 to process the received data stream to, for example, check encryption information. The micro-controller system requires much more current than the LF active receiver 125 alone. If the device is woken up by a false alarm, the remote transceiver circuit 120 consumes energy unnecessarily. This is undesirable, especially for a car key, in which excellent energy management is required because the device is ideally operated with a single battery for many years.

The average false alarm rate (FAR) for a correlator such as that described with reference to FIG. 2 with n-bits can be calculated according to the following equation (assumption: binary input values with normal distribution, equi-probable 1's & 0's, uncorrelated samples, and 1 sample per bit):

$$FAR \propto \frac{1}{2^n} \tag{1}$$

One option for improving (reducing) the false alarm rate is therefore to increase the number of bits (n) in the target pattern. However, in order to minimize power consumption by the vehicle base station, and so maintain the battery of the vehicle, there is a conflicting requirement to minimize the number of bits in the target pattern and so decrease the length of the LF polling signal that is periodically transmitted by the vehicle. A polling system transmitting 24-32 bit patterns typically drains a car battery in 2 weeks, but produces acceptable performance at the car key. It is desirable for the target pattern to be reduced to 8, 10 or 12 bits, or fewer, for example, in order for the duration of the car battery to be improved. However, in one example, 100 false alarms per hour were detected by a car key using the pattern detection unit of FIG. 2 when the target pattern was reduced to a 7 bit pattern. Such a rate of false alarms causes unacceptably high power loss by the key.

Another way to improve (reduce) the false alarm rate of the pattern matching unit is to increase the number of sample-sets that must match a target pattern, with a given number of bits, to authenticate the input signal. This means a significant reduction for the false alarm rate as can be seen in the following equation (assumptions: binary input values with normal distribution, equi-probable 1's & 0's, uncorrelated samples, and 2 matched sample-sets per bit period):

$$FAR \propto \frac{1}{2^{2n}} \qquad (2)$$

This improvement in false alarm rate comes at the cost of a higher required signal-to-noise ratio for the LF-receiver 125, which reduces the effective sensitivity. However, if this sensitivity reduction is acceptable for the application, then this method may be used to reduce the false alarm rate. The loss in sensitivity is proportional to the number of sample-sets required to match per bit period. In the system of FIG. 1, the reduced sensitivity may result in missed alarm or "wakeup" attempts.

A trade-off between false alarm rate and sensitivity/ missed alarm rate (or wakeup rate) can be achieved by reducing the matching requirements for one or more of the matched sample-sets. For example, when a valid signal is received in very low SNR conditions, it may happen that a pattern match is narrowly missed because one or two samples are corrupt. In such cases, it is helpful to accept a small number of sample mismatches for a match attempt to be successful. Information on the number of bit matches/ mismatches per sample-set may be used by a correlator to more accurately distinguish real from false match events relating to the presence of a real input signal or otherwise.

FIGS. 3 and 4a illustrate improved pattern detection units 300, 400 in which the numbers of required matched sample-sets per bit period is increased, and inexact matches are permitted.

The pattern detection units 300, 400 differ from that described above with respect to FIG. 2 in that they each comprise a correlator that is configured to compare a target pattern with two or more samples-sets from the shift register, and to determine whether the input signal matches the target pattern based on the comparison. Each of the two or more sample-sets can be classified as one of: an exact match; an inexact match, which may also be referred to as an approximate match; or a non-match.

The input signal can be determined to match the target pattern when either of the following conditions are satisfied within a single bit period (corresponding to m sample-sets): (i) two or more of the sample-sets are an exact match to the target pattern; or (ii) one sample-set is an exact match to the target pattern and one or more sample-sets are an inexact match to the target pattern. In other examples, the input signal may also be determined to match the target pattern when, within a single bit-period, none of the sample-sets are an exact match to the target pattern and two or more of the sample-sets are an inexact match to the target pattern.

The information provided by the correlator on the specific number of matched samples (bit-mismatch-value or bit-mismatch-value) enables the correlator of FIG. 3 or FIG. 4a to examine a single match event in more detail than the correlator of FIG. 2. A consecutive inexact match and exact match, or the presence of both within a series of m sample-sets (one bit period), can be a strong indication (but not proof) that the match event was caused by the presence of a genuine signal and the presence of noise limited the number of exact matches to only one. The presence of further inexact match is a stronger indication, and so on. By making use of inexact matches, the likelihood of discarding real match events is greatly diminished.

The features of the correlators of FIGS. 3 and 4a, that:
(i) the number of sample-sets that are matched to the target pattern per bit-period is increased (from 1 to >1); and
(ii) inexact matches are detected in addition to exact matches, result in the effects that:
a) the false alarm rate is reduced.
b) sensitivity is improved (missed alarm rate is reduced).

Features (i) and (ii) can be implemented as single independent modifications to the correlator of FIG. 2. Feature (i) results in a reduced false alarm rate at the expense of sensitivity and feature (ii) results in increased sensitivity at the expense of false alarm rate. Implementing both features simultaneously results in a customisable parameter space that enables a non-linear trade-off between false alarm rate and sensitivity. For example, significant improvements can be obtained in false alarm rate with minimal penalty in sensitivity, and vice versa. The enhanced effect of the combination of features (i) and (ii) is discussed further below in relation to FIG. 8.

The specific arrangements of the pattern detection units 300, 400 are discussed separately below with respect to FIGS. 3 and 4a. The determination of exact and inexact matches in the correlators of FIGS. 3 and 4a is discussed with regard to FIGS. 5 and 6. The effect of operating parameters of the correlators of FIGS. 3 and 4a on the false alarm rate and sensitivity are discussed below with respect to FIGS. 7a and 7b.

Regarding FIG. 3, the pattern detection unit 300 differs from that described previously with reference to FIG. 2 in that the correlator 304 comprises a first plurality of bit-comparison-units 312a-n and a second plurality of bit-comparison-units 316a-n. The first and second bit-comparison-units 312a-n, 316a-n are arranged in pairs such that each first bit-comparison-unit 312a-n is associated with a corresponding second bit-comparison-unit 316a-n. Each pair of bit-comparison-units 312a-n, 316a-n compares, in parallel, two different samples in a particular sample-register-group 313a-n in the shift register 302 with a particular bit-value of the target pattern. The effect of the arrangement is that, for the majority of the time (a factor of (m−1)/m), the pair of bit-comparison-units 312a-n, 316a-n processes, in parallel, two different samples associated with the same bit. In this way, the two different samples are compared with a particular bit-value of the target pattern, resulting in two different sample-sets associated with a single bit period being compared with a target pattern.

In this example, a first sample-set comprises a first sample taken from every sample-register-group. The first sample-set is provided to first input terminals of respective first bit-comparison-units 312a-n. A second input terminal of each first bit-comparison-unit 312a-n is configured to receive a respective bit-value of the n-bit target pattern. In this way, each one of the first bit-comparison-units 312a-n is able to compare one sample of a particular sample-register-group in the shift register with a corresponding bit-value of the target pattern and provide a bit-comparison-value at an output terminal. A second sample-set comprises a second sample taken from every sample-register-group. The second sample-set is provided to first input terminals of respective second bit-comparison-units 316a-n. The first and second sets of samples provide pairs of samples from each sample-register-group. The first sample-set comprises different samples to the second sample-set. A second input terminal of each second bit-comparison-unit 316a-n is configured to receive a respective bit-bit value of the n-bit target pattern. In this way, each one of the second bit-comparison-units 312a-n is also able to compare one sample from a particular sample-register-group in the shift register with a corresponding bit-value of the target pattern and provide a bit-comparison-value at an output. The bit-comparison-values indicate whether a sample matches a corresponding bit-value of the target pattern.

The code-comparison-unit 314 has a plurality of input terminals connected to outputs of the respective first and second pluralities of bit-comparison-units 312a-n, 316a-n. The code-comparison-unit 314 is configured to receive the bit-comparison-values from each of the bit-comparison-units 312a-n, 316a-n and determine match-indication-signals that are indicative of whether the first and second sample-sets (two samples in every sample-register-group) match the target pattern.

In this way, the correlator is configured to compare the target pattern to one of the plurality of samples from each sample-register-group (the first sample-set) and, also, to compare the target pattern to another of the plurality of samples from each sample-register-group (the second sample-set) in order to compare the target pattern and two of the plurality of samples of each bit in the shift register. For example, the first bit of the target pattern is compared with the first and second samples from the first sample-register-group 313a, and the $n^{th}$ bit of the target pattern is compared with the first and second samples from the $n^{th}$ sample-register-group 313n, etc. The shift register 302 and correlator 304 may operate with a synchronised clock cycle. The correlator is therefore able to, in one clock cycle, compare a target pattern with two or more sample-sets (two or more of the plurality of samples of each bit). As the input signal is shifted through the shift register 302, the samples compared by the correlator 304 evolve from cycle to cycle.

In the example of FIG. 3, the bit-comparison-units 312a-n, 316a-n, are implemented as XOR gates, which give a logic high output when a sample does not match the corresponding bit-value in the target pattern.

The code-comparison-unit 314 comprises a first summing module and a second summing module (not shown). The first summing module is configured to receive the outputs of the first plurality of bit-comparison-units 312a-n and the second summing module is configured to receive the outputs of the second plurality of bit-comparison-units 316a-n. Each summing module sums the number of samples in a particular sample-set having a particular state. This enables the code-comparison-unit 314 to classify each sample-set according to the number of samples within the sample-set that match the corresponding bit-value of the target pattern. In this example, the summing module sums the number of mismatched samples (to the target pattern) in a compared sample-set provided by the bit-comparison-units 312a-n, 316a-n. Alternatively, the bit-comparison-units 312a-n, 316a-n may be implemented as XNOR gates such that the summing module sums the number of matched samples (to the target pattern) in a compared sample-set. For a known n-bit pattern length, the number of matches and the number of mismatches may convey equivalent information. From an implementation point of view, counting the number of mismatches can lead to reduced hardware requirements because the stored numbers of interest are small (and if the mismatch count overflows the size of the storage then it is not of interest).

The code-comparison-unit 314 can use the output of the summing module to determine a first-match-indication-signal and a second-match-indication-signal representative of the number of samples in the respective first and second sample-sets that match the corresponding bit value of the target pattern. The match-indication-signal may be a bit-match-value that is the number of matched samples (or bits) in a compared sample-set. Alternatively, the match-indication-signal may be a bit-mismatch-value that is the number of mismatched samples (or bits) in a compared sample-set. In the example illustrated in FIG. 3, the first- and second-match-indication-signals are both bit-mismatch-values.

The code-comparison-unit 314 can generate a first-match-status and a second-match-status, for the first and second sample-sets, by comparing the first- and second-match-indication-signals with: (i) an inexact match-threshold $T_i$; and (ii) an exact match-threshold $T_e$. In this way, the code-comparison-unit 314 can classify the first sample-set and the second sample-set with respective match-statuses having states representing:
  (i) an exact match (bit-mismatch-value≤$T_e$);
  (ii) an inexact match ($T_e$<bit-mismatch-value≤$T_i$); or
  (iii) a non-match (bit-mismatch-value>$T_i$).

As an example, the exact match-threshold $T_e$ may be equal to zero mismatched samples, although in alternate embodiments with a large pattern length of N-bits, it may be greater than zero. The inexact match-threshold $T_i$; may be one or two or more mismatched samples. If the match-indication-signals are bit-match-values, the signs of the inequalities reverse and the match-statuses have states representing:
  (i) an exact match (bit-match-value≥$T_e$);
  (ii) an inexact match ($T_i$≤bit-match-value<$T_e$); or
  (iii) a non-match (bit-match-value<$T_i$).

The match threshold values will also change accordingly. For example, an inexact match may correspond to the condition: $T_i$≤match-indication-signal<$T_e$, with $T_i$=N−1, $T_e$=N.

The comparisons that result in the generation of the match-statuses may be performed by one or more multi-bit binary comparators, for example, within the code-comparison-unit 314. In general, each match-status may have multiple components. For example, a match-status may comprise a first-match-status-component and a second-match-status-component. The first-match-status-component may relate to the outcome of a comparison between a bit-mismatch-value and the exact-match-threshold $T_e$. The second-match-status-component may relate to the outcome of a comparison between a bit-mismatch-value and the inexact-match-threshold $T_i$. Each match-status-component may take a Boolean value. The generation of match-statuses from match-indication-signals using the exact match-threshold and inexact match-threshold are discussed further below with regard to FIGS. 5 and 6.

The determination of, and ability to discriminate between, inexact matches and exact matches as described above differs from an example in which an output of an adder in a code-comparison-unit is compared against a single threshold of a minimum number of samples that should match, in which a match is reported if the output of the adder is greater than or equal the single threshold.

In alternative embodiments, the match-indication-signals and/or match-statuses may be generated in separate modules to the code-comparison-unit 314.

Returning to FIG. 3, the input signal may be determined to match the target pattern when any of the following conditions are satisfied within a single bit period (m sample-sets): (i) two or more sample-sets are an exact match to the target pattern; (ii) one sample-set is an exact match to the target pattern and one or more sample-sets are an inexact match to the target pattern; or (iii) none of the sample-sets are an exact match to the target pattern and two or more of the sample-sets are an inexact match to the target pattern.

In this example, the two samples compared by each pair of bit-comparison-units 312a-n, 316a-n are consecutive samples in a sample-register-group. That is, the consecutive samples from each of the sample-register-groups define consecutive sample-sets. This can provide particularly good performance in the presence of interference or a noise signal. Alternatively, the two samples compared by each pair of bit-comparison-units 312a-n, 316a-n could be non-consecutive samples (defining non-consecutive sample-sets).

The shift register 302 of the pattern detection unit 300 differs from that described previously with reference to FIG. 2 in that the $n^{th}$ (last) sample-register-group 313n includes two sample registers instead of the one that is in FIG. 2. Therefore, the shift register 302 of FIG. 3 comprises (n−1)*m+2 sample registers in order to hold (n−1)*m+2 samples of n-bits. Again, each bit of the input signal is oversampled by a factor m.

The pairs of bit-comparison-units 312a-n, 316a-n of FIG. 3 are examples of a set of bit-comparison-units that comprises a plurality of bit-comparison-units. In other examples, the set of bit-comparison-units may comprise three or more bit-comparison-units for each sample-register-group 313. Each bit-comparison-unit in a set may compare respective samples from a sample-register-group with a particular bit-value of the target pattern.

Regarding FIG. 4a, the pattern detection unit 400 comprises a shift register 402 and bit-comparison-units 412a-n that are similar to those described previously with reference to FIG. 3, with the exception that there is only a single plurality of bit-comparison-units 412a-n and the $n^{th}$ (last) sample-register-group 413n includes a single sample register.

The code-comparison unit 414 of FIG. 4a differs from that of FIG. 3 in that it is configured to receive the outputs of the single plurality of bit-comparison-units 412a-n. The code-comparison unit 414 comprises a single summation module that provides a single match-indication-signal for every sample clock cycle. In other words, the plurality of bit-comparison-units 412a-n and the code-comparison-unit 414 are configured to process one sample-set per sample clock cycle. The pattern detection unit 400 differs from that described with reference to FIG. 3 in that the correlator 404 further comprises a sequence detector 420, which may also be referred to as a run-length detector.

The sequence detector 420 is configured to determine whether the input signal matches the target pattern based on a plurality of match-indication-signals, representative of a plurality of sample-sets, received from the code-comparison-unit 414. The plurality of match-indication-signals may be determined for consecutive, or different, sample clock cycles/sample-sets. The sequence detector may determine whether the input signal matches the target pattern based on a plurality of match-indication-signals from a single bit period.

In this way, the correlator 404 is configured to compare the target pattern with one sample-set and, subsequently, to compare the target pattern to another sample-set. Therefore, the correlator 404 can compare the target pattern with two of the plurality of samples of each bit from the shift register (two sample-sets). The shift register 402 and correlator 404 may operate with a synchronised clock cycle. The correlator is therefore able to, in one clock cycle, compare the target pattern with a first sample-set that is representative of each bit and, in a subsequent clock cycle, to compare the target pattern with a second samples-set that is representative of each bit. In this way, the correlator 404 can determine whether or not the input signal matches the target pattern based on such comparisons for two or more clock cycles.

A summation module of the code-comparison-unit 414 is used in the same manner as described above to determine a match-indication-signal representative of the number of samples in a sample-set that match the corresponding bit value of the target pattern. The code-comparison-unit 414 may classify each sample-set as a match-status that is one of: (i) an exact match; (ii) an inexact match; and (iii) a non-match following the same approach as that explained in relation to FIG. 3 above.

The sequence, or run-length, detector 420 in this example is configured to monitor the output of the code-comparison-unit 414 and determine when the input signal matches the target pattern. A match may be achieved when any of the following conditions are satisfied within a single bit period (m sample-sets): (i) two or more sample-sets are an exact match to the target pattern; (ii) one sample-set is an exact match to the target pattern and one or more sample-sets are an inexact match to the target pattern; or (iii) none of the sample-sets are an exact match to the target pattern and two or more of the sample-sets are an inexact match to the target pattern.

Alternatively, the code-comparison-unit 414 may provide the match-indication-signal as an output to the sequence detector 420, and the sequence detector 420 may monitor the match-indication-signals (rather than match-statuses) to determine when the input signal matches the target pattern.

The pattern detection unit 400 of FIG. 4a provides an efficient way to achieve the same or similar effect to the pattern detection unit of FIG. 3, but with almost no additional hardware effort when compared with FIG. 2. Instead of duplicating the number of bit-comparison-units in the correlator 404, the match-indication-signal that is provided as an output signal of the code-comparison-unit 414 is processed multiple times with a sequence detector 420. In FIG. 3, the plurality of sample-values are processed in parallel using information stored in a plurality of sample registers in each sample-register-group. In FIG. 4a, the plurality of sample-values are processed sequentially, over time, using information stored in a single sample register in each sample-register-group.

Furthermore, synergies with other signal processing applications are possible, based on the mismatch information produced by the correlator. Such information may be generated solely for the purpose of accurate false alarm rate reduction, but it may also find use in applications such as error tolerance (increasing sensitivity compared to standard correlation-based matching) or estimating signal arrival time with high resolution.

The correlator 304; 404 may be configured to compare the target pattern to consecutive sample-sets of the input signal in the shift register. This can simplify operation of the device.

The correlator 304; 404 may be configured to compare the target pattern to a limited number of sample-sets of the input signal in the shift register. This may provide a good trade-off between reduced sensitivity and a decrease in false alarm events for some car key applications.

The pattern detection unit 300; 400 may optionally comprise a memory for storing the target pattern. In such examples, the memory is operatively connected to the correlator 304; 404 for providing the target pattern to the correlator 304; 404.

Figure 4B:
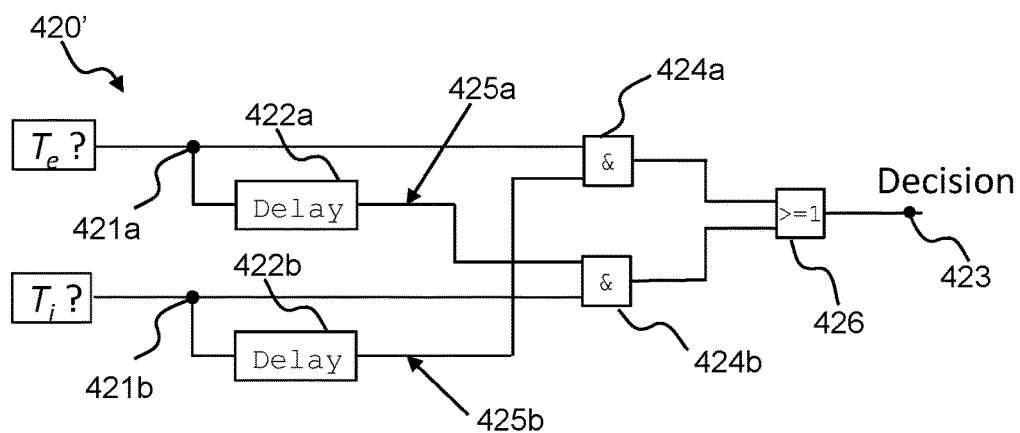

FIG. 4b illustrates an example implementation of a sequence detector 420' for use in the pattern detection unit of FIG. 4a. The sequence detector 420' has a first input terminal 421a, a second input terminal 421b and an output terminal 423. The first and second input terminals 421a, 421b are together configured to receive a match-status from a code-comparison-unit. An output signal at the output terminal 423 of the sequence detector 420' is indicative of whether the input signal matches the target pattern.

In this example, the match-status comprises a first-match-status-component and a second-match-status-component. The first input terminal 421a of the sequence detector 420' is configured to receive the first-match-status-component from the code-comparison-unit and the second input terminal 421b of the sequence detector 420' is configured to receive the second-match-status-component.

The first-match-status-component is at logic high when the bit-mismatch-value (or bit-match-value, depending on the configuration of the code-comparison-unit) meets the exact-match-threshold $T_e$, and logic low otherwise. The second-match-status-component is at logic high when the bit-mismatch-value (or bit-match-value) meets the inexact-match-threshold $T_i$, and logic low otherwise. In this way, the match-status represents an exact match when both the first-match-status-component and the second-match-status-component are high, and an inexact match is represented when the first-match-status-component is low and the second-match-status-component is high. As such, the match-status represents an exact match when either two exact matches in a row are received or one exact match and one inexact match are received one after the other.

The sequence detector 420' comprises a first delay buffer 422a and a second delay buffer 422b. The first delay buffer 422a is configured to receive the first-match-status-component from the first input terminal 421a and to provide a buffered-first-match-status-component 425a. The second delay buffer 422b is configured to receive the second-match-status-component from the second input terminal 421b and to provide a buffered-second-match-status-component 425b. In this example, the delay buffers 422a, 422b apply a time delay that corresponds to the over-sampling frequency that is applied by the shift register (not shown). Therefore, the buffered first and second match-status-components 425a, 425b are delayed versions of the first and second match-status-components received at the respective input terminals 421a, 421b.

First and second AND gates 424a, 424b each have a first input terminal, a second input terminal and an output terminal. The first input terminal of the first and second AND gates 424a, 424b are configured to receive the respective first or second match-status-components. The second input terminal of the first and second AND gates 424a, 424b are configured to receive the respective buffered first and second match-status-components from the respective delay buffers 422a, 422b. The output terminals of the first and second AND gates 424a, 424b are each connected to two input terminals of an OR gate 426. The output terminal of the OR gate 426 is connected to the output terminal 423 of the sequence detector 420.

The effect of the sequence detector 420' is that the output signal 423 is set to a value that is indicative of a match if the pattern is successfully matched for two consecutive sample-sets. That is, two consecutive matches may include (i) an exact match followed by an inexact match, (ii) an inexact match followed by an exact match, or (iii) two exact matches. For the example in which an exact match is followed by an inexact match, for a first sample cycle, both the first and second match-status-components will be high and for a second sample cycle the first-match-status-component will be low and the second-match-status-component will be high. For the second sample cycle, the buffered first and second match-status-components (corresponding to the first cycle) will also be high. The second AND gate 424b will receive a high signal at both input terminals and provide a resulting high signal to the OR gate 426. The OR gate will provide a high signal to the output terminal 423 of the sequence detector 420' indicating a match between the input signal and the target pattern.

An alarm is only signaled if the correlator detects a match for two or more consecutive cycles. Since up to m successful match attempts are expected for a true match, an alarm is still triggered for all cases except those where the signal-to-noise ratio is low enough to limit the match to only one cycle. Other examples of sequence detectors may include additional delay buffers to relax the matching conditions to include non-consecutive sample-sets occurring within a bit period.

Figure 5:
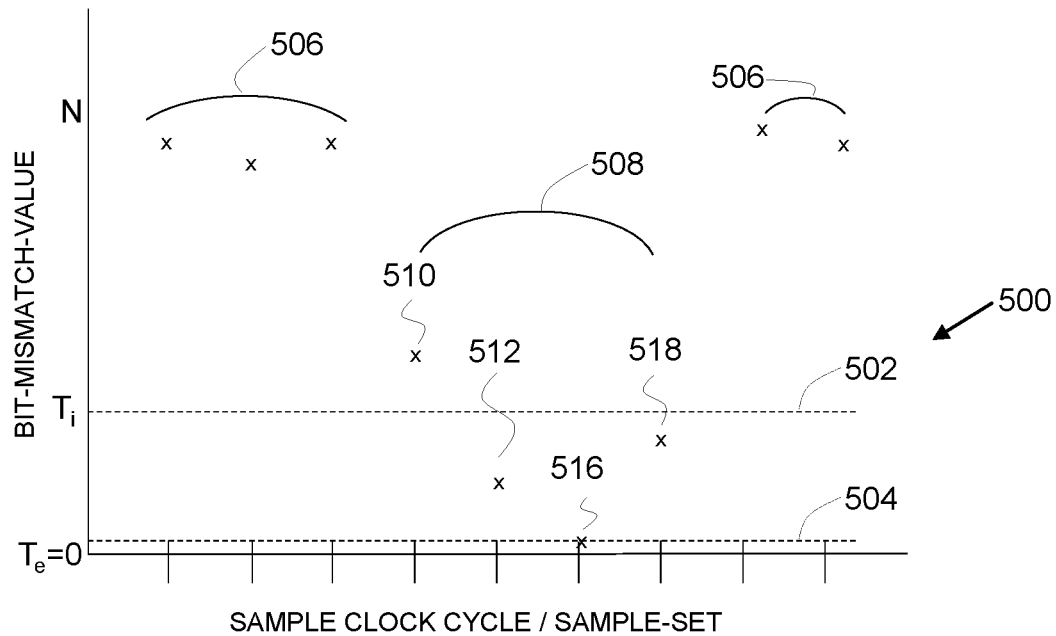

FIG. 5 illustrates a profile of the bit-mismatch-value as a function of time over various sample clock cycles/sample-sets for a correlator such as that described previously with reference to FIGS. 3 and 4a. The bit-mismatch-value may be a multi-bit value representing an integer that is generated by a code-comparison-unit as described previously. The bit-mismatch-value is within a range from zero (all of the samples taken from the shift register match the corresponding bits of the target pattern) to a maximum value (in which no samples match the target pattern and the number of unmatched samples is equal to the length of the n-bit target pattern).

An inexact match-threshold 502 $T_i$ and an exact match-threshold 504 $T_e$ are marked on the profile 500 in FIG. 5. In this example, the exact match-threshold 504 $T_e$ is equal to zero, although other values may be used where the exact match-threshold is greater than zero. In general, for bit-mismatch-values, the exact match-threshold 504 is less than the inexact match-threshold 502 ($T_e < T_i$). The inexact match-threshold 502 is greater than zero ($T_i > 0$).

FIG. 5 illustrates a first set 506 of bit-mismatch-values from sample-sets corresponding to sample clock cycles in which the input signal is not in accordance with the target pattern. Following the expressions outlined in relation to FIGS. 3 and 4a, these sample-sets are classified as non-matches (bit-mismatch-value>$T_i$). A second set 508 of bit-mismatch-values is also shown, in which the input signal does correspond to the target pattern. However, due to the presence of noise in the system, not all of the bit-mismatch-values in the second set 508 represent exact matches (bit-mismatch-value≤$T_e$). That is, each of the second set 508 contain corrupted samples that do not match the corresponding bit of the target pattern. A first bit-mismatch-value 510, represents a sample-set that is a non-match (bit-mismatch-value>$T_i$). Second and fourth bit-mismatch-values 512, 518 in the second set 508 are greater than the exact match-threshold and less than or equal to the inexact match-threshold ($T_e$<bit-mismatch-value≤$T_i$); they represent sample-sets that are an inexact match. The third bit-mismatch-value 516 in the second set 508 is less than the inexact match-value and less than or equal to the exact match-value (bit-mismatch-value<$T_i$; bit-mismatch-value≤$T_e$): the third bit-mismatch-value 516 represents a sample-set that is an exact match.

Figure 6:
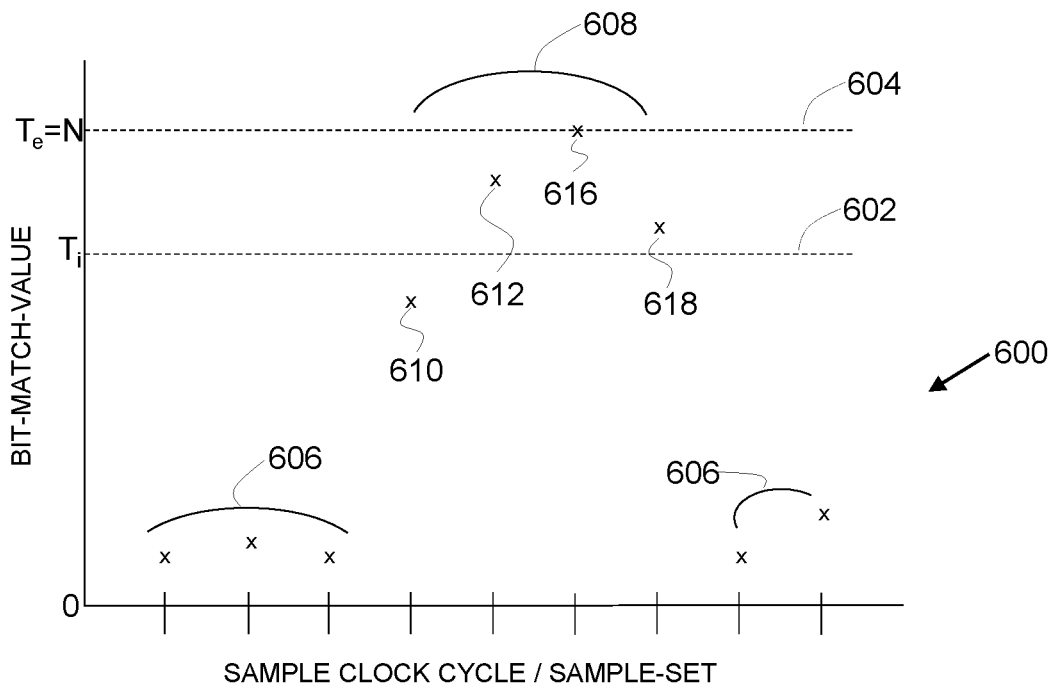

FIG. 6 illustrates a profile of the bit-match-value for a similar data set to FIG. 5. Numbers representing the equivalent data points as those in FIG. 5 have been given corresponding numbers. In this example, the exact match-threshold $T_e$ 604 is equal to the length of the n-bit target pattern, N, although other values may be used where the exact match-threshold is less than N. In general, for bit-match-values, the exact match-threshold is greater than the inexact match-threshold ($T_e > T_i$). The inexact match-threshold is greater than zero ($T_i > 0$).

FIG. 6 illustrates how the values of the exact match-threshold 604 and the inexact match-threshold 602 change when considering bit-match-values instead of bit-mismatch-values. The position of the data points relative to the threshold values satisfy the expressions defined with in relation to FIGS. 3 and 4a such that bit-match-values 606 and 610 still represent non-matches; bit match-values 612 and 618 still represent inexact matches; and bit-match-value 616 still represents an exact match.

In one example, utilising bit-mismatch-values as match-indication-signals, the following match-status may be defined as:

An exact match on the condition that all samples in the sample-set match the corresponding bit of the target pattern exactly. This is satisfied when bit-mismatch-value=$T_e$=zero. By definition, an exact match relates to one clock period (one match attempt).

An inexact match on the condition that no more than $T_i$ samples in a sample-set are different from the respective bits of the N-bit target pattern. This condition is satisfied when $T_e$<bit-mismatch-value≤$T_i$. The inexact-match-threshold $T_i$, (or approximation level), may be in the lower-single-digit range for typical applications.

According to this example, the input signal can be determined to match the target pattern as follows:

If the correlator signals two or more exact matches within a bit period (m samples-sets), the event is assumed to be real and an alarm is signalled.

If the correlator signals one exact match, but a number $N_i$ or more inexact matches in addition, within one bit period (m sample-sets), the event is also assumed to be real and an alarm is signalled. The parameter $N_i$ may be in the lower-single-digit range for typical applications.

If the correlator signals one exact match and no or fewer than $N_i$ inexact matches, the event is assumed to be false and no alarm is signalled.

As discussed below with regard to FIGS. 7a and 7b, adjustment of the two parameters $N_i$ and $T_i$ may allow the performance of the correlator of the pattern detection unit to be tailored to a particular application. In particular, the trade-off between the gain (reduction) in false alarm rate and loss in sensitivity may be controlled.

Figure 7A:
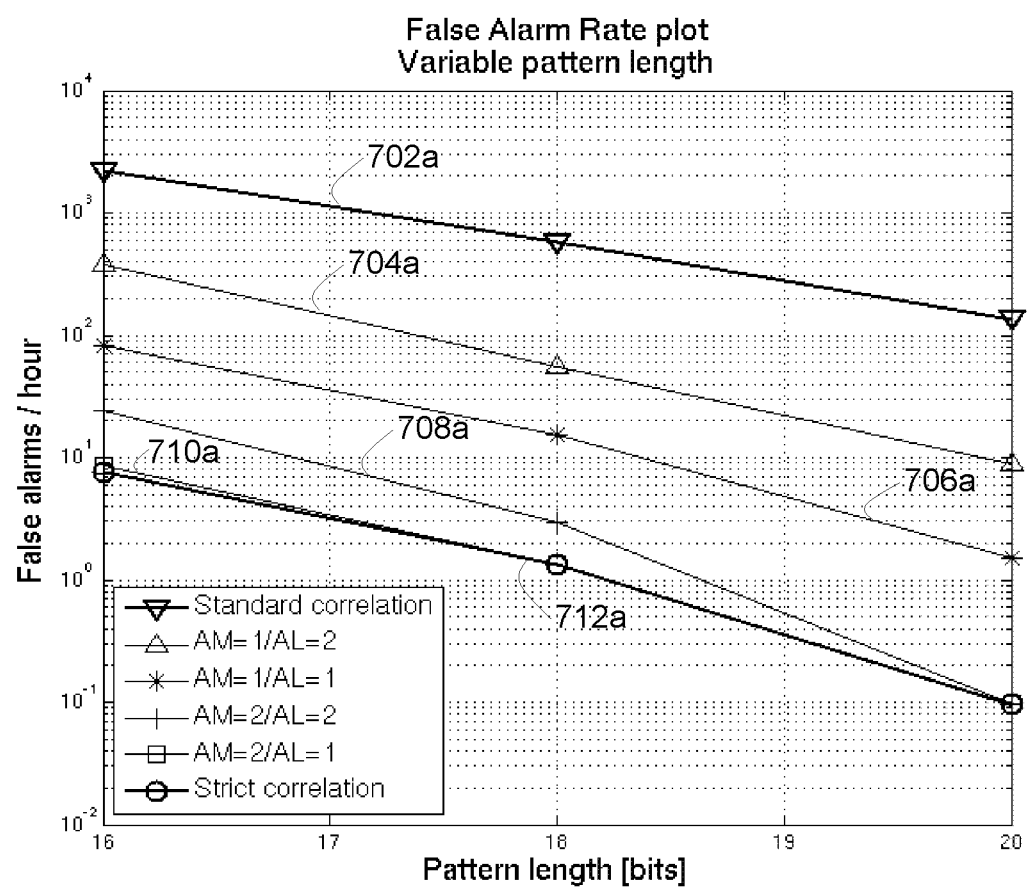
Figure 7B:
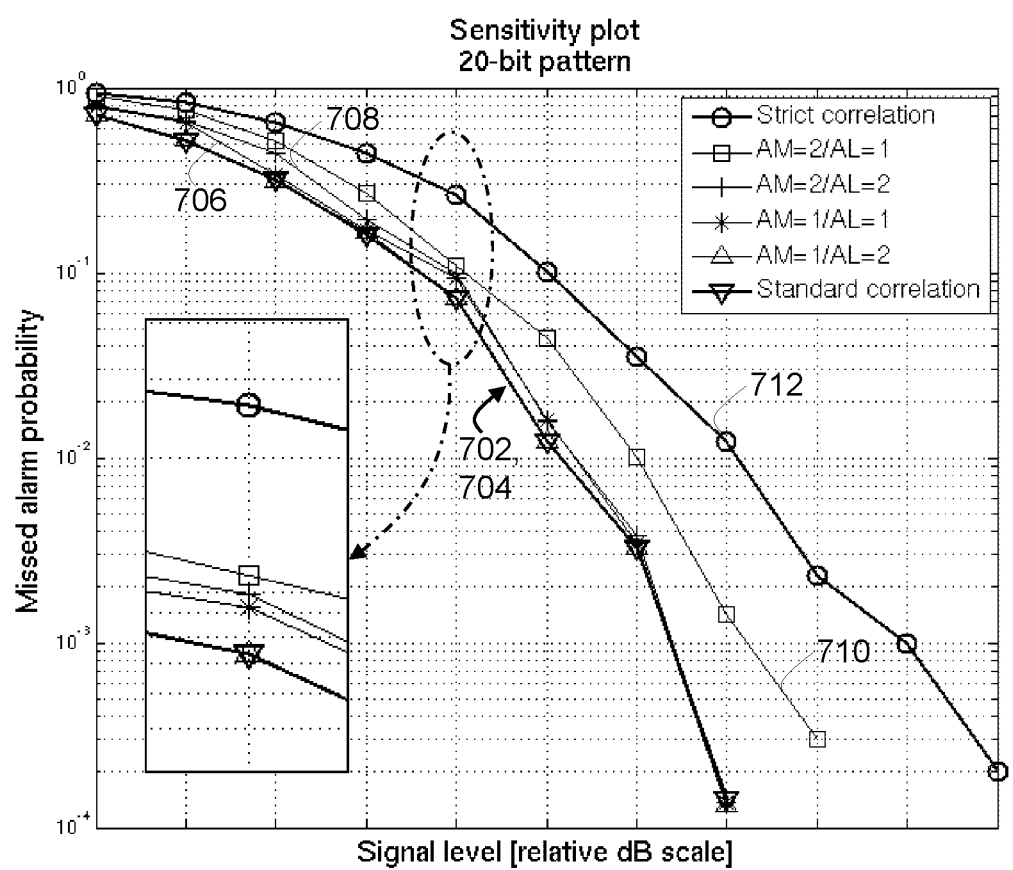

FIG. 7a illustrates false alarm rate dependence on the number of bits in a target pattern for various configurations of the pattern detection unit of FIGS. 3 and 4a, utilising different values of $T_i$ and $N_i$. The various profiles relate to:

a standard correlator profile 702a;
an $N_i$=1; $T_i$=2 (1-2) profile 704a;
an $N_i$=1; $T_i$=1 (1-1) profile 706a;
an $N_i$=2; $T_i$=2 (2-2) profile 708a;
an $N_i$=2; $T_i$=1 (2-1) profile 710a;
a strict correlation profile 712a, where $N_i$ is the number of inexact matches that are required in addition to an exact match, and $T_i$ is the number of bits that can mismatch within an inexact match, as discussed above. A standard correlator relates to the example described with reference to FIG. 2, in which $N_i$=0. A strict correlator requires two exact matches, in this example.

In general, the false alarm rate drops as the bit-length of the target pattern increases, in accordance with equation (1). Different $T_i$ and $N_i$ values result in the different curves shown.

An increasing number of required inexact matches (larger $N_i$) results in stricter correlation match conditions. That is, the pattern detection unit is less likely to determine a match between the input signal and target pattern when the number of inexact matches required is increased. A large $N_i$ favours false alarm rate reduction at the expense of sensitivity (missed alarm rate). An increasing approximation level (larger $T_i$) results in more lenient correlation conditions and more frequent inexact matches. A large $N_i$ favours sensitivity (missed alarm rate) at the expense of reduction of false alarm rate.

The correlation for profiles 704a-710a is at least as strict as the simple correlation in profile 702a provided by the pattern detection unit of FIG. 2 because, in this example, at least one exact match is always required to determine a match between the input signal and the target pattern. Also, in this example, the conditions for profiles 704a-710a are never stricter than the simple condition for profiles 712a requiring two exact matches within one bit period.

As demonstrated in FIG. 7a, the correlator of FIG. 3 or FIG. 4a may be operated in various modes, including—

(i) A standard mode of operation can be defined by setting $N_i$ equal to zero. The resulting conditions degenerate to the simple correlation-provided by the correlator of FIG. 2, and an alarm may be signalled any time one or more exact matches are detected within a single bit period.

(ii) A strict mode of operation can be defined by setting $T_i$ equal to zero. In this mode, an inexact match becomes equivalent to an exact match. At least two exact matches are required within a bit-period to produce an alarm.

(iii) Improved modes that exist between the standard and strict modes and corresponding to both $T_i$ and $N_i$ being non-zero and less than or equal to N, the number of bits in the target pattern.

In this way, it is possible to implement a reduced false alarm rate for a short bit length target pattern while another, longer bit length target pattern can be searched with increased sensitivity. In general, different settings of the correlator can be applied to different situations, such as different target pattern lengths. In some examples, the correlator may be configured to switch between a first-mode-of-operation and a second-mode-of-operation during use.

The pattern detection units 300; 400 of FIGS. 3 and 4a may include a controller (not shown) that is configured to set the mode of operation. The controller can set the mode of operation based on user input, for example when configuring the pattern detection unit, or can be set automatically based on pattern length, as discussed below. The controller may also be configured to select one of a plurality of target patterns for matching. For example, if multiple target patterns are to be used, then the pattern detection unit 300, 400 can include one correlator 304, 404 per pattern, such that the multiple correlators share a common shift register 302, 402. The controller (not shown) can enable one or more of the multiple different target patterns based on a use case (for example, one pattern for Passive Keyless Entry, PKE, and one for Passive Keyless Go, PKG).

This functionality can allow a device that includes the pattern detection unit of FIG. 3 or 4 to be configured according to its particular requirements, either in: (i) the standard mode-of-operation with a higher false alarm rate but excellent sensitivity, or (ii) a reduced-false-alarm-rate mode of operation with improved false alarm rate and moderate sensitivity loss. This functionality can be particularly beneficial if the target pattern length is configurable, and multiple target patterns are supported simultaneously by the pattern detection unit. In this way, it can be possible to activate the false alarm improvement only for one very short target pattern, while at the same, another longer target pattern can be searched with full sensitivity. That is, a pattern detection unit can apply the first-mode-of-operation for a first instance of a target pattern, and can apply the second-mode-of-operation for a second instance of a target pattern FIG. 7b illustrates the missed alarm rate dependence on the signal-to-noise ratio for the various configurations of the pattern detection unit of FIGS. 3 and 4a described previously with reference to FIG. 7a. Corresponding numbering for reference numerals is used between FIGS. 7a and 7b to describe corresponding profiles.

In this example, the optimum configuration in terms of false alarm rate, for the standard correlator profile 702b, has the largest sensitivity penalty, whereas the optimum configuration in terms of sensitivity, for the strict correlator profile 712b, has the worst false alarm rate.

Tuning the values of $T_i$ and $N_i$ parameters allows very precise control of the trade-off between false alarm rate and sensitivity/missed alarm rate, as illustrated with profiles 704b-710b. Significantly, a pair of $T_i$ and $N_i$ values may be identified such that both performance indicators (false alarm rate and missed alarm rate) are suitable for a particular application.

FIG. 8 conceptually illustrates the control of the trade-off between the false alarm rate and sensitivity/missed alarm rate.

A standard mode ($N_i=0$; $T_e=0$) 802 and strict mode ($N_i>0$, $T_i=0$) 804 indicate the typical linear trade-off between them. In the standard mode 802, a single sample-set is used in each determination and only true exact matches result in the determination of a match. In the strict mode 804, a plurality of true exact matches within a particular bit-period are required before an overall match is determined.

An error-tolerant mode ($N_i=0$; $T_e>0$) 808 is also illustrated. The error-tolerant mode 808 corresponds to the condition of requiring only one, inexact match that results in a further improvement of missed alarm rate over the standard mode 802, but at the cost of further false alarms.

An improved mode ($N_i>0$, $T_i>0$) 806 highlights the precise control of the trade-off between the false alarm rate and sensitivity that can be achieved by correlators such as those described in relation to FIGS. 3 and 4a. With appropriate choice of parameters $T_e$, $T_i$, and $N_i$, the improved mode 806 can achieve a significant reduction in false alarm rate relative to the standard mode 802 (almost at the performance of the strict mode 804) with a minimal penalty in missed alarm rate.

FIG. 9 illustrates a method 900 of detecting a pattern in an input signal, which can be performed using the pattern match detector described previously with reference to FIG. 3 and FIG. 4a. The method 900 comprises receiving 902 a multi-bit input signal at a shift register. The received multi-bit input signal is over-sampled 904 using the shift register such that each bit of the input signal is represented by a plurality of samples in the shift register. A target pattern is compared 906 with two or more of the plurality of samples of each bit of the input signal in the shift register. The two or more of the plurality of samples can be processed in the same clock cycle, using two sample registers within each group of sample registers, as discussed with reference to FIG. 3. Alternatively, the two or more of the plurality of samples can be processed using the output of a single sample register within each group of sample registers, over two clock cycles, as discussed above with reference to FIG. 4a. In order to determine whether or not the input signal matches the target pattern, the method classifies 908 whether, with respect to the target pattern, each compared sample-set as one of: an exact match; an inexact match; or a non-match.

Another method for reducing false alarm events is to use a signal monitor to assess whether a reasonably strong signal is available before a target pattern matching process is started, for example by a pattern detection unit. However, such kind of signal strength indicators may result in a loss in sensitivity and they are prone to interferers. Furthermore, such a signal strength indicator might require a specific protocol (e.g. an unmodulated burst signal in front of the protocol) for reliable detection, and can consume a large amount of current. Advantageously, the use of a pattern detection unit such as that described with reference to FIG. 3 or FIG. 4a results in improved implementation simplicity, configurability and sensitivity loss compared to a system that uses a signal monitor. Nonetheless, combination of a signal monitor with the pattern detection units of FIGS. 3 and 4 may lead to further improvements in performance.

The systems and methods described above may, in general, be applied to all wired or wireless communication protocols, including biphase code. Biphase coding adds a level of complexity to the coding process but in return includes a way to transfer a frame data clock that can be used in decoding to increase accuracy. In biphase coding there may be a state transition in the message signal of every bit frame. This allows a demodulation system to recover the data rate and also synchronize to bit edge periods. With this clock information, the data stream can be recreated.

Manchester coding, which is a type of biphase coding, provides a means of adding the data rate clock to the message to be used on the receiving end. Manchester coding provides the added benefit of yielding an average DC level of 50%. This has positive implications in the demodulator's circuit design as well as managing transmitted RF spectrum after modulation. This means that in modulation types where the power output is a function of the message such as amplitude modulation (AM), the average power is constant and independent of the data stream being encoded.

Manchester coding states that there will be a transition of the message signal at the mid-point of the data bit frame. What occurs at the bit edges depends on the state of the previous bit frame and does not have to produce a transition. A logical "1" is defined as a mid-point transition from low to high and a "0" is a mid-point transition from high to low.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A pattern detection unit comprising:
a shift register configured to over-sample a multi-bit input signal such that each bit of the input signal is represented by a plurality of samples in the shift register; and
a correlator configured to compare a target pattern with two or more sample-sets, each sample-set comprising a corresponding sample from each of the plurality of samples of each bit, and classify each compared sample-set as one of:
an exact match;
an inexact match; or
a non-match
to the target pattern in order to determine whether or not the input signal matches the target pattern;
wherein the pattern detection unit is configured to be operable in a first-mode-of-operation and a second-mode-of-operation, wherein:

in the first-mode-of-operation:
the correlator is configured to compare the target pattern with two or more of the plurality of samples of each bit from the shift register in order to determine whether or not the input signal matches the target pattern; and
in the second-mode-of-operation:
the correlator is configured to compare the target pattern with only one of the plurality of samples of each bit from the shift register in order to determine whether or not the input signal matches the target pattern; and
the pattern detection unit further comprises a controller configured to set the mode of operation of the pattern detection unit based on user input or automatically.

2. The pattern detection unit of claim 1, in which the input signal is determined to match the target pattern when any of the following conditions are satisfied within a predetermined number of sample-sets:
two or more of the sample-sets are an exact match to the target pattern; or
one sample-set is an exact match to the target pattern and one or more sample-sets are an inexact match to the target pattern.

3. The pattern detection unit of claim 1, in which the correlator is configured to compare the target pattern with one of the sample-sets and, subsequently, to compare the target pattern to another of the sample-sets in order to compare the target pattern to the two or more sample-sets.

4. The pattern detection unit of claim 3, in which the correlator is configured to compare the target pattern to consecutive sample-sets from the shift register.

5. The pattern detection unit of claim 3, in which the correlator comprises:
a plurality of bit-comparison-units, each bit-comparison-unit configured to compare one sample of a particular bit from the shift register with a corresponding bit-value of the target pattern and determine a bit-comparison-value based on the comparison;
a code-comparison-unit, wherein the code-comparison-unit is configured to sum the bit-comparison-values for one sample-set in order to determine a match-indication-signal that is representative of the number of samples in the sample-set that match their corresponding bit-value of the target pattern.

6. The pattern detection unit of claim 5, in which the correlator comprises a sequence detector configured to determine whether the input signal matches the target pattern based on two or more match-indication-signals provided by the code-comparison-unit for different sample-sets.

7. The pattern detection unit of claim 5, wherein the code-comparison-unit is configured to generate a match-status by comparing the match indication signal with:
at least one inexact match-threshold; and
an exact match-threshold.

8. The pattern detection unit of claim 7, in which the correlator comprises a sequence detector configured to determine whether the input signal matches the target pattern based on two or more match-statuses provided by the code-comparison-unit for different sample-sets.

9. The pattern detection unit of claim 1, in which the correlator is configured to compare the target pattern with one of the sample-sets and, in parallel, to compare the target pattern with another of the sample-sets in order to compare the target pattern to the two or more sample-sets.

10. The pattern detection unit of claim 9, in which the correlator comprises:

a first plurality of bit-comparison-units, each bit-comparison-unit configured to compare a first sample of a particular bit from the shift register with a corresponding bit-value of the target pattern and determine a first bit-comparison-value based on the comparison;

a second plurality of bit-comparison-units, each bit-comparison-unit configured to compare a second sample of the particular bit from the shift register with a corresponding bit-value of the target pattern and determine a second bit-comparison-value based on the comparison; and a code-comparison-unit, wherein the code-comparison-unit is configured to:

sum the first bit-comparison-value in order to determine a first-match-indication-signal that is representative of the number of samples in a first sample-set that match the corresponding bit-value of the target pattern; and sum the second bit-comparison-value in order to determine a second-match indication-signal that is representative of the number of samples in a second sample-set that match the corresponding bit-value of the target pattern.

11. The pattern detection unit of claim 10, in which the code-comparison-unit is configured to:

generate a first-match-status for the first sample and a second-match-status for the second sample by comparing the respective first and second match indication signals with:

an inexact match-threshold; and an exact match-threshold.

12. The pattern detection unit of claim 7, in which:

the exact match-threshold corresponds to all of the samples in a sample-set matching their corresponding bit-value of the target pattern;

the inexact match-threshold corresponds to some but not all of the samples in a sample-set matching their corresponding bit-value of the target pattern.

13. An automotive access system transceiver, the transceiver comprising:

a receiver for receiving a multi-bit input signal;

a data-receiving circuit comprising the pattern detection unit of claim 1;

a transmitter; and a control circuit to control the transmitter and receiver for communicating signals with a vehicle base station, wherein the target pattern is associated with the vehicle base station, and wherein the controller is configured, in response to finding a match between the input signal and the target pattern, to operate the transmitter of the remote transceiver circuit to send an authorisation signal to the vehicle base station.

14. A method of detecting a pattern in an input signal, comprising:

receiving a multi-bit input signal at a shift register;

over-sampling the multi-bit input signal using the shift register such that each bit of the input signal is represented by a plurality of samples from the shift register;

comparing a target pattern with two or more sample-sets, each sample-set comprising a corresponding sample from each of the plurality of samples of each bit; and classifying each compared sample-set as one of:

an exact match;

an inexact match; or a non-match to the target pattern in order to determine whether or not the input signal matches the target pattern, operating in a first-mode-of-operation in which the correlator is configured to compare the target pattern with two or more of the plurality of samples of each bit from the shift register in order to determine whether or not the input signal matches the target pattern; and operating in a second-mode-of-operation in which the correlator is configured to compare the target pattern with only one of the plurality of samples of each bit from the shift register in order to determine whether or not the input signal matches the target pattern.

* * * * *